United States Patent Office 3,298,275
Patented Jan. 17, 1967

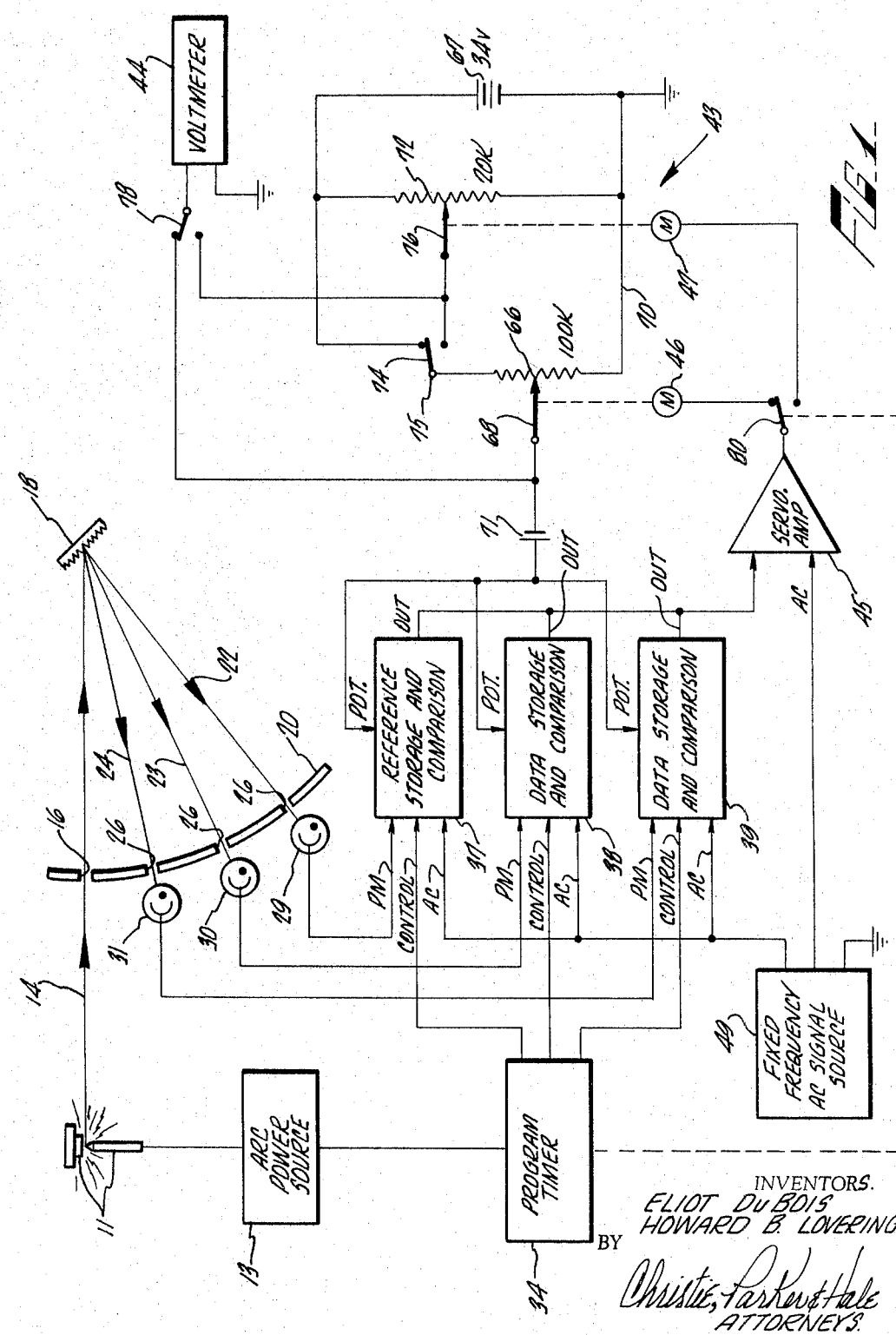

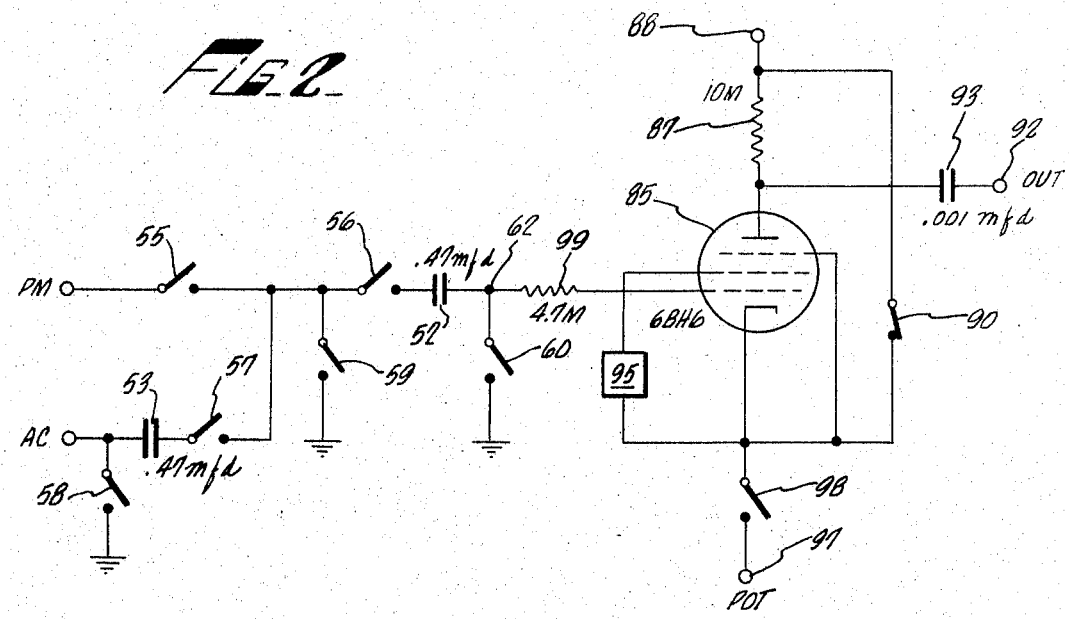
FIG_2.
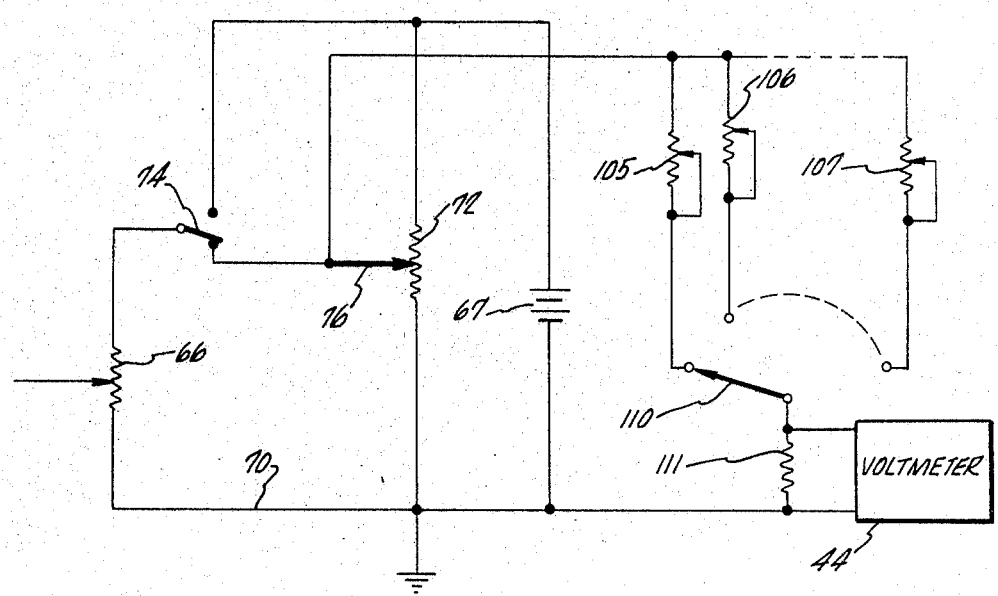
FIG_3.
INVENTORS.
ELIOT DuBOIS
HOWARD B. LOVERING
BY Christie, Parker & Hale
ATTORNEYS.

3,298,275
COMPARISON SIGNAL CIRCUIT FOR MEASURING INTENSITY OF SPECTRAL LINES
Eliot Du Bois, Monrovia, Calif., and Howard B. Lovering, Bedford, Mass., assignors to Consolidated Electrodynamics Corporation, Pasadena, Calif., a corporation of California
Continuation of application Ser. No. 246,566, Dec. 21, 1962. This application Apr. 19, 1965, Ser. No. 449,041
6 Claims. (Cl. 88—14)

This application relates to apparatus for measuring the intensity of spectral lines in dispersed radiation from a sample being analyzed, and is a continuation of our copending application Serial No. 246,566, filed December 21, 1962, and now abandoned.

One method of determining the composition of an unknown material is to analyze the spectrum of radiation emitted from an excited sample of the material. By ascertaining the presence and intensity of selected spectral lines in the spectrum, the presence and relative abundance of various elements in the sample can be determined.

Many different types of spectrometric instruments are available to perform this type of analysis. The apparatus of this invention is suitable for use with spectrometers which disperse radiation from an excited sample into a spectrum from which certain "data" spectral lines are selected for examination. An electrical signal is then generated for each data spectral line, the magnitude of the signal being proportional to the intensity of the associated spectral line.

Spectral-line intensity typically varies during an "exposure" period over which the sample is excited. It is therefore desirable to provide storage means for integrating spectral-line intensity signals over the exposure period so an average intensity can be determined. At the end of this period, the several stored electrical signals representing average intensities of the several data lines are measured. The signals are preferably measured sequentially to avoid the expense and complexity of providing one complete measuring and readout system for each spectral line being measured.

Accurate analysis is best achieved by comparing the intensity of the data lines to the intensity of a reference spectral line of known characteristics. Use of such an "internal standard" compensates for variations in the sample structure, in the exciting and dispersing means, and for other instrument components in which variations tend to affect the intensities of all the spectral lines of interest. The intensity measurement is therefore typically expressed as a ratio of the intensity of the data line to the intensity of the reference line, rather than as the absolute intensity of the data line.

The apparatus of this invention provides a novel means for measuring the stored electrical signals, and for presenting the measurement in terms of an intensity ratio of the data line to the reference line. The apparatus is characterized by high accuracy and reliability, low cost, and relative insensitivity to noise signals. Switching of the measuring apparatus is performed at low impedance levels to avoid inaccuracy in the resulting data.

The measurement apparatus permits the spectrometer to be operated over a fixed exposure period, with measurements being made after this period is complete. The exposure period can be varied to suit the requirements of a particular analysis problem, and it is also possible to use multiple exposure periods for complex analytical programs. Multiple internal-standard reference lines can also be used, and the apparatus is sufficiently flexible that a single line can be used as both a reference line and a data line.

The apparatus measures the various spectral-line intensities in sequence rather than in parallel, and the measurement is linear rather than logarithmic as in measuring devices which rely on decay time of a capacitor. Both of these features are desirable as they contribute to overall simplicity and permit the use of a variety of readout and printing devices. A novel correction circuit compensates for dark current when photocells are used to convert spectral-line intensity to electrical signals. Provision is made for simple calibration of the apparatus in response to the measurements obtained by analyzing a sample of known characteristics.

Briefly stated, the spectral intensity measuring apparatus of this invention includes means for storing an electrical signal analogous in magnitude to the intensity of a spectral line dispersed from a source in a spectrometer. Generating means produce a variable signal. Comparison means determine when the variable signal bears a predetermined relation to the stored signal, and measurement means measure the variable signal.

In a preferred form of the invention, the apparatus of this invention includes at least one additional comparison means whereby the intensities of a data spectral line and a reference spectral line are measured, and a signal proportional to the ratio of the two intensities is provided. Another form of the invention contemplates a storage means which comprises two separate capacitors interconnected whereby a dark-current correction can be accomplished automatically during the measurement. Still another form of the invention includes an adjustable resistor between the generating means and the measuring means whereby the measuring apparatus can be periodically calibrated.

Details of the invention will be discussed with reference to the accompanying drawings in which:

FIG. 1 is a combined block diagram and partial electrical schematic of the apparatus of this invention as coupled to a spectrometer;

FIG. 2 is a partial electrical schematic of a comparator as used in the invention; and FIG. 3 is an electrical schematic of a portion of a variable signal generator as used in the invention.

Referring to FIG. 1, a schematic diagram of a typical spectrometer is shown at the upper portion of the drawing. Material to be analyzed is formed into electrodes 11, and excited to luminescence by being connected across arc power source 13. Radiation 14 from the sample-electrode arc is transmitted through an entrance slit 16 to impinge on a dispersing means such as defraction grating 18. The radiation is dispersed into a spectrum of rays 22, 23, and 24 which focus as discrete spectral lines on a focal curve 20 of the spectrometer.

In a typical analytical program, a number of spectral lines are selected for analysis. This may involve selection and measurement of one or more internal-standard "reference" lines, and perhaps ten to thirty "data" spectral lines, the intensity of which will be compared to the intensity of the reference lines. Thus, in FIG. 1 the spectral line arising from ray 22 may be selected as a reference spectral line. The spectral lines arising from rays 23 and 24 may be selected as data spectral lines.

Exit slits 26 are positioned along the focal curve to intercept the selected reference and data spectral lines, permitting the radiant energy in the respective lines to impinge on transducing means whereby the radiant energy is converted to an electrical signal. Photomultiplier tubes are commonly employed to generate this signal. Thus, the reference spectral line would typically be directed through an optical system (not shown) to impinge on reference photomultiplier 29. Data spectral lines similarly impinge on data photomultipliers 30 and 31.

Each photomultiplier tube output is an electric signal proportional to the intensity of the impinging spectral line. The apparatus of this invention measures these signals and thereby derives an indication of the intensity of the selected spectral lines.

The spectrometer includes a program timer 34 which establishes the operating sequence of the analytical program. The program timer controls the initiation and duration of arcing in the sample electrodes, and provides commands to sequence or step the measurement apparatus of this invention through its various operating modes. Program timers of this type are well known to those skilled in the art of spectroscopy, and, for brevity, are not described in detail.

The measurement apparatus of this invention includes storage means and comparison means for each data and reference spectral line to be measured. In the block diagram of FIG. 1, these means are grouped together for simplicity of illustration. Thus, the output from reference photomultiplier 29 is the input (PM) to reference storage and comparison circuits 37. Similarly, the outputs from data photomultipliers 30 and 31 are inputs (PM) to respective data storage and comparison circuits 38 and 39. Program timer 34 is interconnected with each of the respective storage and comparison circuits to provide CONTROL inputs for correct sequencing of the various switching steps to be described below.

The invention also includes variable signal generating means interconnected with each storage and comparison circuit. In FIG. 1, the generating means is shown in the form of a potentiometer circuit 43 having a POT output. Measuring means, such as voltmeter 44, serve to measure the signals produced in the generating means. The voltmeter is preferably of the digital readout type, permitting printing or other recording of the measured voltages.

In a preferred form of the invention, the generating means includes a servo amplifier 45, servo motors 46 and 47, and fixed-frequency A.-C. signal source 49 whereby measurements can be made automatically. In this preferred form, a fixed-frequency A.-C. signal from source 49 serves as an AC input to the servo amplifier and to each respective storage and comparison circuit 37, 38, and 39, and an output OUT from each of these circuits serves as an input to the servo amplifier. The servo-amplifier output can be switched to either of the two servo motors which are in turn mechanically coupled to potentiometers in circuit 43.

A typical storage and comparison circuit is shown in FIG. 2. The storage circuit includes storage capacitors 52 and 53, and SPST switches 55, 56, 57, 58, 59 and 60. These switches are adapted for actuation by program timer 34, and they would typically be conventional electromechanical relays.

In operation, and prior to excitation of the sample to be analyzed, the storage capacitors are first discharged by closing switches 56, 57, 58, 59, and 60 whereby the capacitors are shorted through ground connections. Switches 56 and 59 are then opened, and switch 55 closed to permit charging of capacitor 53 with the dark-current signal from the associated photomultiplier tube. This charging period will typically correspond in duration to the subsequent exposure period over which capacitor 52 will be charged.

Switches 57 and 58 are then opened, and the sample is excited by the arc power source. Switches 55 and 56 are then closed, permitting capacitor 52 to be charged through the exposure period by the photomultiplier signal which now represents dark current plus a spectral current corresponding to the energy in the spectral line being measured. Switches 55 and 60 are then opened at the end of the exposure period.

In preparation for the measurement operation described below, switch 57 is then closed to connect the two capacitors in series. In this mode, the potential across capacitor 53 subtracts from the potential across capacitor 52, whereby the potential existing across the two capacitors (presented between an AC terminal and a terminal 62 in FIG. 2) represents the spectral current plus dark current, less the dark current. Dark-current compensation is thus provided, as the potential across the two capacitors represents spectral current alone.

A feature of this arrangement of storage capacitors is that complete flexibility is provided as to the choice of charging times during the dark-current and spectral-current charging periods. If it is desirable to make these periods equal, the two storage capacitors are chosen to be of equal value. If, for example, it is desired to make the dark-current charging period shorter in duration than the spectral-current charging period, capacitor 53 is selected to be of proportionately lower capacity than capacitor 52. The spectral-current charging period can be selected to fit the requirements of the analytical program, and need not be restricted to some specific capacitor potential or some specific reference-line charging period.

Referring to FIG. 1, the variable signal generating means includes a variable-impedance device such as a reference potentiometer 66 connected across an electrical source such as a battery 67. A variable signal will be presented between an arm 68 of the potentiometer and a grounded connection 70 of the potentiometer and battery. A bias battery 71 can be provided to establish the proper voltage level between the potentiometer arm and the data and reference comparators.

In a preferred form of the invention, the potentiometer circuit is adopted for ratio measurements by the inclusion of a variable-voltage source for the reference potentiometer such as a data potentiometer 72 connected across battery 67. To avoid loading effects, reference potentiometer 66 has a resistance considerably higher than the resistance of data potentiometer 72, typical values for the two potentiometers being 100,000 ohms and 20,000 ohms, respectively. Measuring means, such as voltmeter 44, measure the voltage between either potentiometer arm and ground through a SPDT switch 78.

The operation of this current will become clear from the following analysis in which:

$e_r$ is a first variable signal appearing at arm 68 when reference potentiometer terminal 75 is connected directly to battery 67 through switch 74;

$e_d$ is a second variable signal appearing at arm 68 when reference potentiometer terminal 75 is connected to arm 76 of the data potentiometer through switch 74;

$e_m$ is a third variable signal appearing at arm 76 of the data potentiometer;

$k_r$ is the setting of the reference potentiometer (total resistance divided into the resistance between arm 68 and ground);

$k_d$ is the setting of the data potentiometer (total resistance divided into the resistance between arm 76 and ground); and $e_o$ is the voltage of battery 67.

It will be clear from inspection of the drawings that the first variable signal is determined by the following equation:

$$e_r = k_r e_o$$

When the level of this signal has been set in a manner yet to be described, the reference potentiometer setting $k_r$ is then left fixed, and switch 74 is actuated to connect terminal 75 to arm 76 of the data potentiometer. Arm 76 is then adjusted until a second variable signal of desired magnitude is obtained at arm 68. Ignoring loading effects, the several signals are then determined by the following equations:

$$e_m = k_d e_o$$

$$e_d = k_r e_m$$

Combining the above three equations:

$$\frac{e_\mathrm{d}}{e_\mathrm{r}} = \frac{e_\mathrm{m}}{e_\mathrm{o}} = kd$$

and $$e_\mathrm{m} = \frac{e_\mathrm{d}}{e_\mathrm{r}} e_\mathrm{o}$$

That is, the setting $k_\mathrm{d}$ of the data potentiometer and the magnitude of third variable signal $e_\mathrm{m}$ are directly related to the ratio of the second variable signal to the first variable signal.

While the potentiometers can be manually operated, the potentiometer circuit is preferably made automatic by the use of servo motors 46 and 47 coupled to the arms of the reference and data potentiometers respectively. Servo amplifier 45 drives either motor 46 or 47, depending on the position of switch 80 which is controlled by the program timer. Fixed frequency A.C. signal source 49 is associated with the servo amplifier, and provides a first input of say 0.5-volt level, at say 400 cycles per second, to the servo amplifier. A second input to the servo amplifier is obtained from the comparator circuits, and the servo amplifier will have an output when these two inputs do not cancel each other. The A.C. signal source servo amplifier, and motors are of conventional design and will not be described in detail.

In a preferred form of the invention, the servo amplifier is arranged whereby each comparison step in the measurement process commences with the potentiometer arm to be driven set at a maximum position. That is, the servo motor drives the arm to provide a decreasing potential at the potentiometer arm during the comparison step. Specific means for reversing the servo motor and returning the potentiometer arm to a position of maximum potential at the end of a measurement step are well known in the art and will not be described in detail.

The function of the comparison circuits is to determine when a signal from the variable signal generating means bears a predetermined relation to a stored signal which is proportional to spectral-line intensity. Referring to the right-hand portion of FIG. 2, a typical comparison circuit includes a variable conductive element such as a tube 85. The plate of this tube is connected to a resistor 87 which is in turn connected to terminal 88. A conventional plate voltage supply (not shown) provides a potential of say 250 volts between terminal 88 and circuit ground. Terminal 88 is also connected to the cathode of tube 85 through normally closed SPST switch 90 which is controlled by the program timer. The tube plate is also connected to an output terminal 92 through coupling capacitor 93, the output terminal providing a signal to the servo amplifier as shown in FIG. 1.

A variable screen-voltage supply 95 is connected between the cathode and screen of tube 85, and provides a gain adjustment for the comparison circuit. The screen-voltage supply may be of conventional design and will not be described in detail. The cathode is also connected to a POT terminal 97 through SPST switch 98 which is controlled by the program timer. As shown in FIG. 1, the output of the variable signal generating means is connected to POT terminal 97. The control grid of tube 85 is connected to the storage means through coupling resistor 99.

Tube 85 is maintained non-conductive except during the actual comparison operation by closed switch 90 and open switch 98. When a comparison is to be made, switch 90 is opened, and the variable signal generating means is connected to the cathode of tube 85 by closing switch 98. The storage-circuit switches are arranged whereby switches 55, 58, 59, and 60 are open, and switches 56 and 57 are closed. An A.C. signal from fixed frequency signal source 49 is impressed between the AC terminal in the storage circuit and ground.

With the switches set in this manner, a voltage is impressed between the tube grid and ground which is equal to the capacitively stored signal (ranging up to say 25 volts) representing spectral line intensity, plus the fixed-frequency A.-C. signal (of say one-half volt). The cathode of tube 85 is maintained above ground at a potential equal to the maximum output of the potentiometer circuit. The circuit parameters are chosen whereby the tube is non-conductive in this condition.

The output of the potentiometer circuit is then decreased, lowering the cathode bias until the tube begins to conduct, causing the amplified fixed-frequency A.-C. signal to appear at the output terminal. The circuit is easily calibrated whereby the level of this output signal represents a known relationship between variable signal and the stored signal.

When the variable signal generating means incorporates the servo system already described, the comparison circuit output signal serves as one input to the servo amplifier, and a signal from fixed-frequency signal source 49 serves as a second output. When the output signal becomes equal in magnitude to the signal derived directly from source 49, the two signals cancel as they are adjusted to be of opposite phase. The servo amplifier total input is therefore reduced to zero; and the servo amplifier ceases to drive the associated servo motor, establishing a setting on the associated potentiometer which fixes the output of the variable signal generator.

A feature of this arrangement, in which the servo amplifier differentially combines an A.-C. signal of fixed amplitude with one of variable amplitude, is that the circuit parameters may be selected so a comparator "critical" output sufficient to stop a servo motor will result from substantially the same grid-to-cathode voltage in each of the several comparators used in the apparatus. Minor variations can be compensated by adjusting the screen voltage and thereby the gain of each tube. Thus, the several comparators can be matched whereby a critical output signal occurs for the same grid-to-cathode voltage in each comparator tube. The potentiometer circuit also aids stability and matching as it functions as a degenerative resistance in series with the cathode, minimizing gain variations arising from changes in tube characteristics. The separate screen-voltage supply serves to keep the amplifier gain essentially independent of cathode potential.

The overall operation of the measurement apparatus will now be described. The program timer commands excitation of the material to be analyzed, data and reference signals being stored in the storage capacitors in the manner already described. After the exposure period is complete, the program timer actuates the reference spectral line comparator (as described above) and sets switches 74 and 80 whereby the servo amplifier drives servo motor 46 coupled to the reference potentiometer, and terminal 75 of the reference potentiometer is connected directly to battery 67.

The servo system then operates to decrease the first-variable-signal output of the variable signal generator until the reference comparator generates an output signal which stops the servo motor. The termination of the comparison step can be sensed in any conventional way, or the program timer can simply allot a fixed period sufficient to cover the longest-duration comparison period which is anticipated. The program timer then commands readout of the first variable signal appearing at arm 68 of the reference potentiometer by connecting voltmeter 44 to this arm through switch 78. The setting of the reference potentiometer is thereafter left unchanged, thereby storing in the potentiometer circuit a value which is analogous to the intensity of the reference spectral line.

The program timer then actuates a data spectral line comparator, and sets switches 74 and 80 whereby the servo amplifier drives servo motor 47 coupled to the data potentiometer, and terminal 75 of the reference potentiometer is connected to arm 76 of the data potentiometer. The servo system then operates to decrease the level of the second variable signal appearing at arm 68 until the data comparator generates an output signal which stops servo motor 47. The program timer then commands readout of the third variable signal by connecting voltmeter 44 to arm 76 through switch 78. As already described, this signal will be proportional to the ratio of the data spectral line intensity to the reference spectral line intensity. Potentiometer linearity or loading errors do not affect measurement accuracy as the potentiometer-arm voltage rather than position is being measured.

The program timer than continues to switch through the several comparator circuits until the intensity of each data line has been measured in terms of a ratio to the reference spectral line intensity. If a second reference spectral line is used, the program timer can command a resetting of the reference potentiometer to store a value analogous to the intensity of this line. The data spectral lines to be compared to this second reference spectral line are then measured by scanning through the data comparators in the manner just described.

A modified form of the invention is shown in FIG. 3 in which an adjustable trim potentiometer is provided for each data comparator used in the apparatus. For example, if three data comparators are used, three trim potentiometers 105, 106, and 107 are provided. One end of each trim potentiometer is connected to arm 76 of data potentiometer 72. The other end of each trim potentiometer is connected to a point on a single-pole multi-throw switch 110 which is in turn connected to resistor 111. This resistor is connected to ground, and voltmeter 44 is connected across the resistor to measure a voltage analogous to voltage appearing at arm 76.

Switch 110 is coupled to the program timer whereby it is actuated to switch trim potentiometers as the program timer switches between the several comparator circuits. Adjustment of the trim potentiometers permits simple calibration of each comparator circuit in response to the measurements obtained when analyzing a standard sample material of known characteristics.

What is claimed is:
1. In a spectrometer having means for generating radiation from a sample to be analyzed, means for dispersing the radiation into spectral lines characteristic of the sample composition, and transducing means for generating a data signal analogous to the intensity of a data spectral line and a reference signal analogous to the intensity of a reference spectral line; spectral intensity measurement apparatus comprising:

storage means connected to the transducing means for receiving and storing the data and reference signals;

signal-generating means including an adjustable potentiometer having a pair of input terminals, a fixed-voltage source, a variable-voltage source, and switching means connected to the input terminals, fixed-voltage source and variable source, the switching means having a first position for connecting the potentiometer across the fixed-voltage source whereby the potentiometer has an output of a variable reference-comparison signal as the potentiometer is adjusted, and having a second position for connecting the potentiometer across the variable-voltage source whereby the potentiometer has an output of a data-comparison signal as the voltage of the variable-voltage source is varied;

reference-comparison means connected to the storage means to receive the stored reference signal, and including a switch connected to the potentiometer whereby the reference-comparison means selectively receives the reference-comparison signal, the reference-comparison means having an output for indicating when the potentiometer has a specific setting which produces a reference-comparison signal bearing a predetermined relation to the stored reference signal;

data-comparison means connected to the storage means to receive the stored data signal, and including a switch connected to the potentiometer whereby the data-comparison means selectively receives the data-comparison signal, the data-comparison means having an output for indicating when the variable-voltage means has a setting which produces a data-comparison signal bearing a predetermined relation to the stored data signal while the potentiometer has the specific setting; and measuring means connected to the variable-voltage means for measuring the variable voltage applied to the potentiometer whereby a measurement analogous to the ratio of the stored data and reference signals is obtained.

2. Spectral intensity measurement apparatus in accordance with claim 1, and further comprising servo means connected to the reference-comparison and data-comparison means to receive the respective outputs, the servo means having a pair of servo motors respectively coupled to and adapted to drive the potentiometer and the variable-voltage source whereby the reference-comparison and data-comparison signals are varied in response to the outputs of the reference-comparison and data-comparison means.

3. Spectral intensity measurement apparatus in accordance with claim 2, and in which the reference-comparison means and data-comparison means each comprises an electron tube having a control grid connected to the storage means to receive the stored reference and data signals respectively, a cathode, and a screen grid; adjustable-voltage means connected to the cathode and the screen grid for providing a gain adjustment;

and switching means for selectively connecting the cathode to the signal-generating means to receive the reference-comparison and data-comparison signals respectively;

and in which the spectral intensity measurement apparatus further comprises a source of a fixed-frequency A.-C. signal connected to the servo means and connected to the storage means whereby the A.-C. signal is combined with the stored signals and appears at the grids of the respective electron tubes.

4. Spectral intensity measurement apparatus in accordance with claim 2, in which the variable-voltage source comprises a second potentiometer connected across the fixed-voltage source, the second potentiometer being mechanically coupled to one of the servo motors and having an arm connected to the switching means.

5. Spectral intensity measurement apparatus in accordance with claim 1, in which the storage means includes a dark-current correction circuit for each data and reference signal received from the transducing means, each correction circuit comprising a first capacitor for receiving and storing a dark-current signal from the transducing means, a second capacitor for receiving and storing a signal analogous to spectral-line intensity from the transducing means, and switching means for connecting the first and second capacitors whereby the stored signal delivered to the respective comparison means represents the spectral-line signal less the dark-current signal.

6. Spectral intensity measurement apparatus in accordance with claim 1 and further comprising a multiplicity of said data-comparison means connected to the storage means to receive a multiplicity of respective stored data signals, and program-control means connected to each data-comparison means for sequentially actuating each switch connected to the potentiometer whereby the stored data signals are measured in serial sequence.

(References on following page)

References Cited by the Examiner

UNITED STATES PATENTS

| | | | |
|---|---|---|---|
| 2,577,815 | 12/1951 | Saunderson et al. | 88—14 |
| 2,588,368 | 3/1952 | Edgerton | 88—23 |
| 3,102,921 | 9/1963 | Peras | 88—14 |
| 3,207,996 | 9/1965 | Sundstrom | 88—14 |

FOREIGN PATENTS 1,143,904  10/1957  France.

JEWELL H. PEDERSEN, *Primary Examiner.*

RONALD L. WIBERT, *Examiner.*

L. ORLOFF, E. S. BAUER, *Assistant Examiners.*